(12) United States Patent
Kim et al.

(10) Patent No.: US 7,372,834 B2
(45) Date of Patent: May 13, 2008

(54) METHOD OF CONTROLLING TRANSMISSION POWER OF RETRANSMISSION PACKET AND MOBILE TERMINAL USING THE SAME

(75) Inventors: Ki Jun Kim, Seoul (KR); Young Woo Yun, Seoul (KR); Soon Yil Kwon, Kunpo-si (KR); Jong Hoe An, Anyang-shi (KR); Chan Ho Kyung, Incheon (KR); Jee Woong Seol, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 10/934,814

(22) Filed: Sep. 3, 2004

(65) Prior Publication Data

US 2006/0252445 A1    Nov. 9, 2006

(30) Foreign Application Priority Data

Sep. 3, 2003    (KR) ................. 10-2003-0061564

(51) Int. Cl.
*H04Q 7/00* (2006.01)
(52) U.S. Cl. ............... 370/331; 370/335; 370/342; 370/479; 370/252; 455/452.1; 455/438; 455/522; 713/320; 713/330; 713/340; 714/4; 714/14; 714/748
(58) Field of Classification Search ........ 370/331, 370/335, 342, 479, 252, 326; 455/452.1, 455/438, 522, 69; 714/748, 4, 14; 713/320, 713/330, 340
See application file for complete search history.

(56) References Cited

U.S. PATENT DOCUMENTS 5,896,411 A * 4/1999 Ali et al. ............... 375/130
6,167,273 A * 12/2000 Mandyam ............... 455/450
6,633,554 B1 * 10/2003 Dalal ..................... 370/331
7,092,717 B2 * 8/2006 Au et al. ............. 455/452.1
2001/0046846 A1 * 11/2001 Tsumura ................. 455/240.1
2002/0049068 A1 * 4/2002 Koo et al. ................ 455/522
2003/0235160 A1 * 12/2003 Saifuddin ................ 370/326
2004/0179494 A1 * 9/2004 Attar et al. .............. 370/332
2005/0009473 A1 * 1/2005 Ranta et al. ............ 455/83
2005/0030953 A1 * 2/2005 Vasudevan et al. ...... 370/395.4
2005/0032536 A1 * 2/2005 Wei et al. ................ 455/517
2005/0226182 A1 * 10/2005 Itoh ....................... 370/329
2006/0040691 A1 * 2/2006 Diep et al. .............. 455/518

(Continued)

FOREIGN PATENT DOCUMENTS

CN    1411182 A    4/2003

(Continued)

*Primary Examiner*—William Trost
*Assistant Examiner*—Julio Perez
(74) *Attorney, Agent, or Firm*—Lee, Hong, Degerman, Kang & Schmadeka

(57) ABSTRACT

The transmission power of a retransmission packet is controlled in the event of a packet retransmission request being sent from a receiving side in a wireless mobile communication system supporting hybrid automatic retransmission request (HARQ) transmission. In a method of controlling transmission power of retransmission packets by a mobile terminal in a wireless mobile communication system supporting hybrid automatic retransmission request (HARQ) transmission, the method includes steps of receiving, from a base station, gain information associated with the sequence of the retransmission packets; determining, using the gain information, transmission power of one of the retransmission packets; and transmitting the retransmission packet with the determined transmission power.

42 Claims, 2 Drawing Sheets

U.S. PATENT DOCUMENTS

2007/0030820 A1* 2/2007 Sarkar et al. ............... 370/315
2007/0066320 A1* 3/2007 Padovani et al. ........... 455/450

FOREIGN PATENT DOCUMENTS

| EP | 1244240 | A2 | 9/2002 |
| EP | 1 244 240 | A3 | 5/2007 |
| WO | WO 02/080403 | A1 | 10/2002 |

\* cited by examiner

METHOD OF CONTROLLING TRANSMISSION POWER OF RETRANSMISSION PACKET AND MOBILE TERMINAL USING THE SAME

This application claims the benefit of Korean Application No. 10-2003-0061564 filed on Sep. 3, 2003, which is hereby incorporated by reference.

BACKGROUND OF THE INVENTION

1. Field of the Invention

The present invention relates to a wireless mobile communication system supporting hybrid automatic retransmission request (HARQ) transmission, and more particularly, to a method of controlling the transmission power of a retransmission packet according to sub-packet identifier (SPID) information.

2. Discussion of the Related Art

HARQ transmission is a link adaptation technique used to provide higher data rates for emerging services utilizing wireless Internet communication via a mobile communication system. Other forms of link adaptation, including transmit power control schemes, are used in conjunction with HARQ transmission to increase receiver reliability when demodulating and decoding the transmission. In a known power control scheme for use in a conventional mobile communication system, the power level of a transmitted signal to be received by a base station is controlled (adjusted) in response to a specific request from the receiver side, to enable data reception for a desired quality of service (QoS) level. Specifically, transmit power control is performed in a mobile communication system to solve the near-far problem occurring in a reverse link, whereby the transmission power of each terminal of both near and far terminals is individually controlled based on the respective power levels received at a specific base station, such that each power level is adjusted to a predetermined level.

There are technical difficulties, however, in simultaneously adopting multiple link-adaptation techniques into an integrated mobile communication system. For example, there are compatibility obstacles to overcome when simultaneously adopting a transmit power control scheme, i.e., a feature of the reverse link, in a mobile communication system together with forward-link features such as adaptive modulation and coding (AMC).

Meanwhile, once an error is detected in a received data packet, a wireless mobile communications system supporting HARQ transmission compensates for the error using the conventional techniques of automatic retransmission request transmission and forward error correction, by temporarily storing (rather than aborting) transmission-failed packets in memory so that the previously received and temporarily stored data may be combined with retransmitted data to secure a higher decoding probability. HARQ transmission, which is carried out by the physical layer in a wireless mobile communications system, is classified as type I, II, or III, based on the amount and type of data included in ensuing retransmissions of a failed data packet. In HARQ type I, if an error occurs in an initial transmission, the same information is fully retransmitted to enable the receiving side to use Chase combining. In HARQ types II and III, which require higher coding gains than in Chase combining, redundancy is incremented in each retransmission, whereby a receiving side can lower a code rate when performing code combining. HARQ types II and III are distinguished based on whether each transmission is self-decodable, whereby HARQ type II is self-decodable and HARQ type III is not.

Meanwhile, the transmission power of a data packet transmitted via a reverse link in a mobile communication system is based on a traffic-to-pilot ratio or TPR, which is calculated for each of a known set of data rates as the ratio of the pilot channel's transmission power to the traffic channel's transmission power and is known to the base station and the mobile terminal. The TPR is determined based on a nominal gain value and an adjustment gain value, each of which are values typically expressed in decibels. The nominal gain value corresponds to a specific or "nominal" situation and serves as a known reference to the mobile terminal, while the adjustment gain value varies situationally, i.e., according to the mobile terminal usage, and is transmitted via signaling from the base station to the mobile terminal.

In performing HARQ transmission in a reverse link of a conventional wireless mobile communication system, the power level for initial packet transmission is set equal to that of packet retransmission. In doing so, a transmitting side applies an identical TPR, which is determined at the time of initially transmitting a packet, to any packet retransmitted later, so that a retransmission packet is transmitted by the same transmission power. Therefore, in case of retransmitting the packet in a reverse link, the same higher transmission power of the retransmission packet, which has been set equal to that of the initial transmission packet, increases an interference amount of the reverse link unnecessarily.

Moreover, the increased interference of the reverse link decreases throughput and unnecessarily increases the number of packet retransmissions necessary for a successful instance of transmission number. Therefore, in performing HARQ transmission in a wireless mobile communication system, the transmission power of successive retransmission packets should be controlled to improve system performance.

SUMMARY OF THE INVENTION

Accordingly, the present invention is directed to a method and apparatus for controlling transmission power of a retransmission packet that substantially obviates one or more of the problems due to limitations and disadvantages of the related art.

An object of the present invention, which has been devised to solve the foregoing problem, lies in providing an improved method of controlling the transmission power of a retransmission packet in a wireless mobile communication system supporting HARQ transmission, by which the transmission power of a transmitting side, e.g., a mobile terminal, is efficiently controlled when retransmitting a packet in response to a packet retransmission request of a receiving side, e.g., a base station.

It is another object of the present invention to provide a method of controlling the transmission power of a retransmission packet, which reduces the interference of a reverse link when retransmitting a packet in a wireless mobile communication system supporting HARQ transmission.

It is another object of the present invention to provide a method of controlling the transmission power of a retransmission packet, which facilitates link adaptation effectiveness in a forward link.

It is another object of the present invention to provide a method of controlling the transmission power of a retransmission packet, which improves system performance.

It is another object of the present invention to provide a mobile terminal suitable for adopting the above methods.

In the following description of the present invention, the term "retransmission packet" refers to a reiterative data packet that, in a wireless mobile communication system supporting HARQ transmission, is to be transmitted to a base station from a specific terminal having received a NACK signal from the base station which initially received a corresponding original packet, the NACK signal corresponding to the original packet and indicating the presence of an error in the received packet, which was originally transmitted from the specific terminal but failed, i.e., included an error, such that the specific terminal should again transmit data of the erroneous packet.

Furthermore, the method of the present invention is described with respect to at least one base station of a wireless mobile communication system and at one mobile terminal transmitting to the base station. Thus, the base station is representative of a receiving side and the mobile terminal is representative of a transmitting side.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of controlling transmission power of retransmission packets by a mobile terminal in a wireless mobile communication system supporting hybrid automatic retransmission request (HARQ) transmission. The method comprises steps of receiving, from a base station, gain information associated with the sequence of the retransmission packets; determining, using the gain information, transmission power of one of the retransmission packets; and transmitting the retransmission packet with the determined transmission power.

In another aspect of the present invention, there is provided a method of controlling transmission power of retransmission packets in a wireless mobile communication system supporting hybrid automatic retransmission request (HARQ) transmission. The method comprises steps of transmitting, to at least one mobile terminal, gain information associated with the sequence of the retransmission packets; and receiving, from the at least one mobile terminal, a retransmission packet transmitted at a transmission power determined by the at least one mobile terminal using the gain information.

In another aspect of the present invention, there is provided a mobile terminal used in a mobile telecommunications system supporting hybrid automatic retransmission request (HARQ) transmission. The mobile terminal comprises means for receiving, from a base station, a plurality of adjustment gain values (or a plurality of adjustment power reduction values) corresponding to each data transmission rate and the sequence of the retransmission packets and for transmitting packets to the base station; means for storing a plurality of values, i.e., a plurality of nominal gain values or a plurality of nominal power reduction values; and means for determining transmission power of one of the retransmission packets according to one of the first and second embodiments of the present invention. In the first embodiment, the determination is made using one of the plurality of adjustment gain values, one of a plurality of nominal gain values, and a pilot-channel transmission power. In the second embodiment, the determination is made using one of the plurality of adjustment power reduction values, one of a plurality of nominal power reduction values, and a pilot-channel transmission power.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations where possible.

The method of the present invention may be adopted in a wireless mobile communication system having multiple base stations and multiple mobile terminals, and it should be appreciated that each mobile terminal of the system may or may not provide intrinsic support for the power reduction of a retransmission packet. Therefore, each embodiment of the present invention can be adopted to a system comprising one or more mobile terminals providing such support, to a system comprising one or more mobile terminals providing no such support, and, in the more likely scenario, to a system comprising one or more of both types, i.e., mobile terminals providing such support as well as of mobile terminals providing no such support. Meanwhile, with power control essentially being a reverse-link function and since the base station utilizes two antennas to receive a signal in the reverse link, it can be presumed that the reverse link provides a channel environment more stable than that of the forward link. Furthermore, assuming that an energy level of the retransmitted packet that is smaller than that of an initial packet can be received, the base station can perform normal decoding by combining the two packets.

First Embodiment

Figure 1:
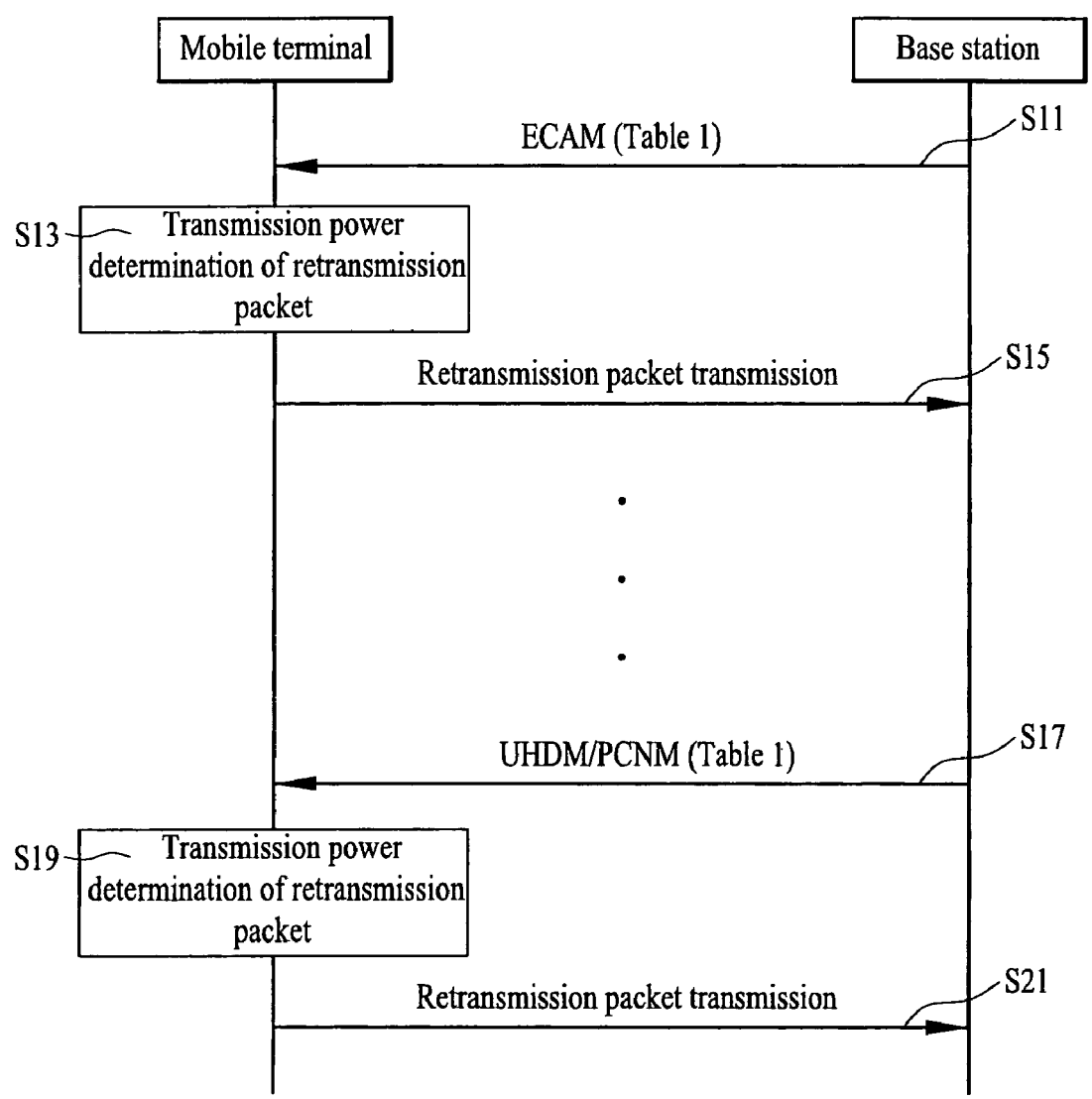
FIG. 1 is a diagram of a method of controlling the transmission power of a retransmission packet according to the present invention.

The first embodiment of the present invention is illustrated in FIG. 1 and is directed to a method of controlling the transmission power of a retransmission packet, in which a set of adjustment gain values stored according to sub-packet identifier (SPID) information is transmitted, via signaling, from a base station to a mobile terminal. Here, the adjustment gain values vary according to a plurality of data transmission rates, and the sub-packet identifier information indicates an instance of packet transmission, for example, an initial transmission, a first retry, or a second retry, in a mobile communications system supporting HARQ transmission. The data transmission rates are those available to the system, including 19,200 kbps, 38,400 kbps, 76,800 kbps, 153,600 kbps, etc.

In a step S11, a set of adjustment gain values, preferably included in an extended channel assignment message (ECAM) transmitted upon call establishment, is transmitted from the base station to the mobile terminal. According to the type of call established, it is determined, preferably by the base station in which a lookup table is stored, whether to support power reduction for a retransmission packet, so that the transmitted adjustment gain values may be varied accordingly. Here, if it is determined that the established call needs no retransmission packet power reduction, the transmitted adjustment gain values vary according to data transmission rate only. On the other hand, if it is determined that power reduction will be needed for a retransmission packet of the established call, the transmitted adjustment gain values vary according to sub-packet identifier as well as data transmission rate. All of the above adjustment gain values are stored in the lookup table. Once the data of the lookup table is received in a mobile terminal adopting the method of the present invention in accordance with the first embodiment, a determination of transmission power for retransmission packets is made in a step S13 as necessary, after which the retransmission packet is transmitted in a step S15. That is, the steps S13 and S15 are repeated by the mobile terminal each time a packet retransmission request is received.

Table 1 is an exemplary lookup table stored in the base station. The table includes a set of adjustment gain values (ADJ_GAIN_SPID_RATE) determined according to data transmission rate for each instance of packet transmission, i.e., its first transmission and a predetermined number of subsequent retries, as well as one bit (ADJ_GAIN_SPID_INCL), for each instance of transmission, respectively indicating whether the currently transmitted message, e.g., the ECAM, contains an adjustment gain value for a specific instance of transmission. Preferably, for a given data transmission rate, the stored adjustment gain values decrease according to the transmission sequence (successive retries) of a retransmission packet. The data of the lookup table is transmitted to a mobile terminal in each of steps S11 and S17 of FIG. 1.

TABLE 1

| packet | field designation | bit length |
|---|---|---|
| initial transmission | ADJ_GAIN_0_INCL | 1 |
|  | ADJ_GAIN_0_19200 | 0 or 8 |
|  | ADJ_GAIN_0_38400 | 0 or 8 |
|  | ADJ_GAIN_0_76800 | 0 or 8 |
|  | ADJ_GAIN_0_153600 | 0 or 8 |
|  | . | 0 or 8 (each) |
|  | . |  |
|  | . |  |
| first retry | ADJ_GAIN_1_INCL | 1 |
|  | ADJ_GAIN_1_19200 | 0 or 8 |
|  | ADJ_GAIN_1_38400 | 0 or 8 |
|  | ADJ_GAIN_1_76800 | 0 or 8 |
|  | ADJ_GAIN_1_153600 | 0 or 8 |
|  | . | 0 or 8 (each) |
|  | . |  |
|  | . |  |
| second retry | ADJ_GAIN_2_INCL | 1 |
|  | ADJ_GAIN_2_19200 | 0 or 8 |
|  | ADJ_GAIN_2_38400 | 0 or 8 |
|  | ADJ_GAIN_2_76800 | 0 or 8 |
|  | ADJ_GAIN_2_153600 | 0 or 8 |
|  | . | 0 or 8 (each) |
|  | . |  |
|  | . |  |

As packet transmission continues after completion of a call establishment between the base station and mobile according to step S11 and steps S13 and 15 as necessary. In doing so, if a change in the channel status warrants a change of the adjustment gain values, the base station transmits to the mobile terminal a new set of adjustment gain values, i.e., a new lookup table, which may be included in any one of a variety of existing messages, for example, a universal handoff direction message (UHDM) or a power control message (PCNM). In a step S17, the new set of values is preferably included in either the UHDM or PCNM, after which a determination of transmission power for retransmission packets is newly made in a step S19 as necessary, after which the corresponding retransmission packet is transmitted in a step S21.

Meanwhile, the base station and mobile terminal each store a set of nominal gain values ($G_{nom}$) corresponding to a specific or "nominal" situation, according to one of three conditions, namely, an Equation Condition 1 or an Equation Condition 2, which are applied depending on the mobile terminal's support characteristics for retransmission packet power reduction, or an selective application of Equation Conditions 1 and 2, in which the base station and mobile terminal each store both sets of nominal gain values. In Equation Condition 1, the stored nominal gain values comprise a first set of values (NOM_GAIN_RATE) that varies according to the data transmission rate only, whereby there can be no intrinsic support for the power reduction of a retransmission packet by the mobile terminal, since there is no variation in the nominal gain values according to sub-packet identifier. In Equation Condition 2, the stored nominal gain values comprise a second set of values (NOM_GAIN_SPID_RATE) that varies according to the sub-packet identifier as well as the data transmission rate, which enables a mobile terminal's intrinsic support of retransmission packet power reduction. In the selective application, the system comprises at least one mobile terminal storing both sets of nominal gain values.

According to the condition of the stored set of nominal gains, the transmission power of a retransmission packet is determined in the mobile terminal by an Equation 1. That is, to control the transmission power of a packet (traffic), i.e., an initially transmitted packet or a retransmission packet, the mobile terminal, which has received the adjustment gain values ($G_{adj}$) of Table 1, applies in each of the steps S13 and S19 the data transmission rate and sub-packet identifier of the packet to be transmitted, to determine its transmission power thus:

$$P_{traffic} = P_{pilot} + 0.125(G_{nom} + G_{adj}) \qquad \text{Eq. 1}$$

where $P_{traffic}$ is the transmission power of a specific packet to be transmitted or retransmitted by the mobile terminal and where $P_{pilot}$ is the transmission power of the pilot signal at the time of transmission of the specific packet. The multiplying factor 0.125 is a value for converting the sum of $G_{nom}$ and $G_{adj}$ into a decibel unit.

When transmitting a specific packet having a specific sub-packet identifier at a specific data rate, the mobile terminal first calculates the traffic-to-pilot ratio using the corresponding adjustment gain value (ADJ_GAIN_SPID_RATE) and nominal gain value (NOM_GAIN_RATE and/or NOM_GAIN_SPID_RATE) according to the condition of the stored nominal gain values, i.e., according to Equation Condition 1 or 2. The mobile terminal then determines the transmission power of the traffic channel, to transmit or retransmit the packet based on the calculated traffic-to-pilot ratio and the transmission power of the pilot signal.

In applying Equation Condition 1, utilizing the first set of nominal gain values (stored according to data transmission rate only), the value of $G_{nom}$ is based on data transmission rate only, for cases where the mobile terminal of the system provides no intrinsic support for retransmission packet power reduction. In other words, power reduction of a retransmission packet is achieved using the value of $G_{adj}$. For reference, application of Equation Condition 1 to Equation 1 may be represented as $P_{traffic} = P_{pilot} + 0.125 (G_{nom\_Rate} + G_{adj\_SPID\_Rate})$.

In applying Equation Condition 2, whereby the mobile terminal of the system utilizes the second set of nominal gain values (stored according to sup-packet identifier as well as data transmission rate), the value of $G_{nom}$ is based on the sup-packet identifier in addition to data transmission rate, for case where the power reduction of a retransmission packet can be achieved in the mobile terminal intrinsically, i.e., without using the value of $G_{adj}$. Therefore, at the time of call establishment, the base station has an option, according to the type of call established, in transmitting adjustment gain values to the mobile terminal. That is, since power reduction of a retransmission packet can be achieved in the mobile terminal using the value of $G_{nom}$ only, the base station may transmit a set of adjustment gain values based on data transmission rate only. For reference, application of Equation Condition 2 to Equation 1 may be represented as $P_{traffic} = P_{pilot} + 0.125(G_{nom\_SPID\_Rate} + G_{adj})$.

When the mobile terminal has access to both sets of nominal gain values, the value of $G_{nom}$ is selectively based on data transmission rate only or the sup-packet identifier in addition to data transmission rate, i.e., based on Equation Condition 1 or 2. Here, too, the mobile terminal of the system intrinsically supports power reduction for packet retransmission. In this case, the base station may transmit to the mobile terminal, preferably via the ECAM containing the adjustment gain values transmitted upon call establishment, a nominal gain value indicator for determining which nominal gain value is be used, thereby enabling the mobile terminal to determine the transmission power of a retransmission packet based on either one of the first and second conditions.

Second Embodiment

Figure 2:
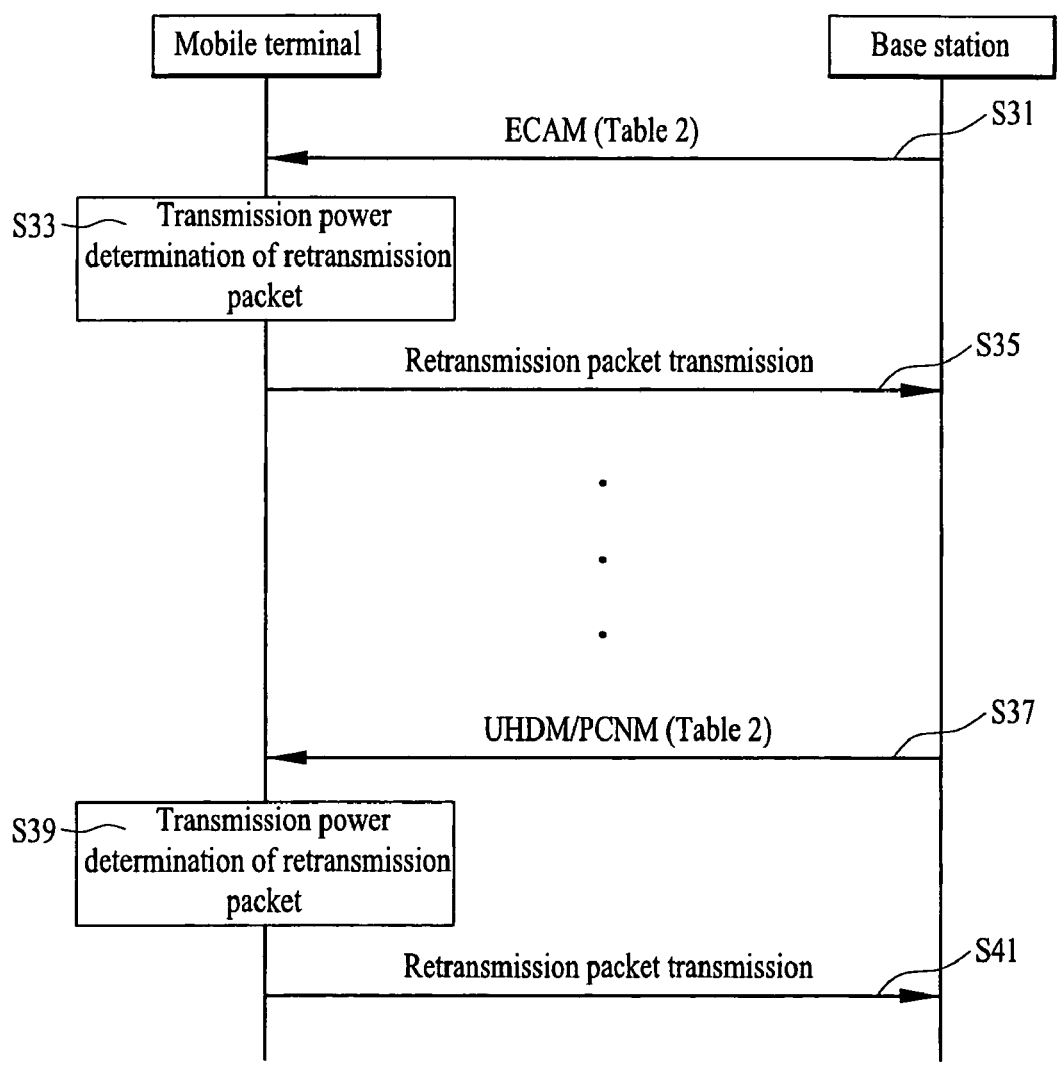
FIG. 2 is a diagram of a method of controlling the transmission power of a retransmission packet according to a second embodiment of the present invention.

The second embodiment of the present invention is illustrated in FIG. 2, in which Table 2 is transmitted from the base station in lieu of Table 1. As shown in Table 2, the data stored in the lookup table includes a set of adjustment gain values stored according to the data transmission rate of the initial packet transmission and a set of adjustment power reduction values stored according to data transmission rate and sub-packet identifier information. Thus, the mobile terminal determines transmission power by applying the adjustment gain values for the initial transmission packet and applying the adjustment power reduction values for any retransmission packets.

The second embodiment is completely analogous to the first embodiment, in that steps S31, S33, and S35 of the second embodiment respectively correspond to the steps S11, S13, and S15 of the first embodiment, which may be executed upon call establishment. At the same time, the steps S37, S39, and S41 of the second embodiment respectively correspond to the steps S17, S19, and S21 of the first embodiment, which may be executed in the event that a subsequent change in channel status warrants a change of the originally transmitted values of Table 2.

Table 2 is an exemplary lookup table stored in the base station and includes a set of adjustment gain values (ADJ_GAIN_RATE) determined according to data transmission rate for the first instance of packet transmission only and a set of reduction gain values (ADJ_RTX_DELTA_SPID_RATE) determined according to data transmission rate for a predetermined number of subsequent retries. Preferably, for a given data transmission rate, the stored adjustment power reduction values decrease according to the transmission sequence (successive retries) of a retransmission packet. Also included is one bit, for each instance of transmission, respectively indicating whether the currently transmitted message contains an adjustment gain value for the first instance of packet transmission and an adjustment power reduction value for a subsequent retry.

TABLE 2

| packet | field designation | bit length |
|---|---|---|
| initial transmission | ADJ_GAIN_INCL | 1 |
|  | ADJ_GAIN_19200 | 0 or 8 |
|  | ADJ_GAIN_38400 | 0 or 8 |
|  | ADJ_GAIN_76800 | 0 or 8 |
|  | ADJ_GAIN_153600 | 0 or 8 |
|  | . | 0 or 8 (each) |
|  | . |  |
|  | . |  |
| first retry | ADJ_RTX_DELTA_1_INCL | 1 |
|  | ADJ_RTX_DELTA_1_19200 | 0 or 3 |
|  | ADJ_RTX_DELTA_1_38400 | 0 or 3 |
|  | ADJ_RTX_DELTA_1_76800 | 0 or 3 |
|  | ADJ_RTX_DELTA_1_153600 | 0 or 3 |
|  | . | 0 or 3 (each) |
|  | . |  |
|  | . |  |
| second retry | ADJ_RTX_DELTA_2_INCL | 1 |
|  | ADJ_RTX_DELTA_2_19200 | 0 or 3 |
|  | ADJ_RTX_DELTA_2_38400 | 0 or 3 |
|  | ADJ_RTX_DELTA_2_76800 | 0 or 3 |
|  | ADJ_RTX_DELTA_2_153600 | 0 or 3 |
|  | . | 0 or 3 (each) |
|  | . |  |
|  | . |  |

Meanwhile, the base station and mobile terminal each store a set of nominal gain values ($G_{nom}$) and a set of nominal power reduction values ($R_{nom}$) corresponding to a specific or "nominal" situation. The nominal gain values are stored according to data transmission rate, and the nominal power reduction values are stored according to sub-packet identifier information as well as data transmission rate.

Therefore, the transmission power of a retransmission packet can be determined in the mobile terminal by an Equation 2. That is, to control the transmission power of a packet (traffic), i.e., an initially transmitted packet or a retransmission packet, the terminal, which has received the adjustment gain values ($G_{adj}$) and adjustment power reduction values ($R_{adj}$) of Table 2, applies in each of the steps S33 and S39 the data transmission rate and sub-packet identifier of the packet to be transmitted, to determine its transmission power thus:

$$P_{traffic} = P_{pilot} + 0.125\{(G_{nom} + G_{adj}) - (\alpha R_{nom} + R_{adj})\} \qquad \text{Eq. 2}$$

where $P_{traffic}$ is the transmission power of a specific packet to be transmitted or retransmitted by the mobile terminal, where $P_{pilot}$ is the transmission power of the pilot signal at the time of transmission of the specific packet, and where a is equal to zero or one according to whether the mobile terminal provides intrinsic support for retransmission packet power reduction. As in the case of Equation 1, the multiplying factor 0.125 is a value for producing a decibel unit.

Accordingly, depending on the mobile terminal's intrinsic support for retransmission packet power reduction, i.e., the value of α, Equation 2 may also be applied according to any one of three conditions, namely, an Equation Condition 3 or an Equation Condition 4, which are applied depending on the mobile terminal's support characteristics for retransmission packet power reduction, or a selective application of Equation Conditions 3 and 4. Here, Equation Conditions 3 and 4 of the second embodiment correspond to Equation Conditions 1 and 2 of the first embodiment, respectively, whereby Equation Conditions 1 and 3 each consider a mobile terminal having no intrinsic support for retransmission packet power reduction and Equation Conditions 2 and 4 each consider a mobile terminal intrinsically supporting retransmission packet power reduction. The selective application of the above sets of Equation Conditions each consider a system in which one or more of both types of mobile terminals are present.

In a contemporary wireless mobile communication system, transmission power of a traffic channel is calculated by simply adding the pilot signal transmission power to a gain value expressed in decibels. In many cases, however, the level of the above traffic channel transmission power (hereinafter referred to as a "simplified traffic power level") is inappropriate or unnecessarily high for a retransmission packet. Therefore, by employing Equation 2 of the present invention, in accordance with either of Equation Conditions 3 and 4, calculation of the traffic channel transmission power is enhanced by applying sub-packet identifier information.

In applying Equation Condition 3, the value of α is zero, such that the term $R_{nom}$ is removed from the equation for cases where there is no intrinsic support in the mobile terminal for retransmission packet power reduction. Thus, when transmitting a specific packet having a specific sub-packet identifier at a specific data rate, the mobile terminal first calculates the traffic-to-pilot ratio using the corresponding adjustment gain value (ADJ_GAIN_RATE) and nominal gain value (NOM_GAIN_RATE). The mobile terminal then determines traffic channel transmission power by an application of Equation Condition 3 to Equation 2, by which only the adjustment power reduction value (ADJ_RTX_DELTA_SPID_RATE) corresponding to the specific sub-packet identifier and the specific data transmission rate is subtracted from a simplified traffic power level based on the calculated traffic-to-pilot ratio and the transmission power of the pilot signal. For reference, application of Equation Condition 3 to Equation 2 gives $P_{traffic}=P_{pilot}+0.125\{(G_{nom\_Rate}+G_{adj\_Rate})-R_{adj\_SPID\_Rate}\}$.

In applying Equation Condition 4, the value of α is one, such that the term $R_{nom}$ is included in the equation for cases where the mobile terminal intrinsically supports retransmission packet power reduction. Here, too, the mobile terminal first calculates the traffic-to-pilot ratio using the corresponding adjustment gain value (ADJ_GAIN_RATE) and nominal gain value (NOM_GAIN_RATE). In this case, however, the mobile terminal determines traffic channel transmission power by an application of Equation Condition 4 to Equation 2, by which the sum of the nominal power reduction value (NOM_RTX_DELTA_SPID_RATE) corresponding to the specific sub-packet identifier and the specific data transmission rate and the adjustment power reduction value (ADJ_RTX_DELTA_SPID_RATE) corresponding to the specific sub-packet identifier and the specific data transmission rate is subtracted from a simplified traffic power level based on the calculated traffic-to-pilot ratio and the transmission power of the pilot signal. For reference, application of Equation Condition 4 to Equation 2 gives $P_{traffic}=P_{pilot}+0.125\{(G_{nom\_Rate}+G_{adj\_Rate})-(R_{nom\_SPID\_Rate}+R_{adj\_SPID\_Rate})\}$.

To implement the selective application of Equation Conditions 3 and 4, the value of α is determined by an a value indicator transmitted from the base station, preferably via the ECAM containing the adjustment gain values transmitted upon call establishment, such that the term $R_{nom}$ may or may not be included in the equation, according to whether the mobile terminal is one providing intrinsic support for retransmission packet power reduction or one providing no such support. Hence, the mobile terminal may, as necessary, apply either of Equation Conditions 3 and 4 to determine the transmission power of a retransmission packet.

A mobile terminal of a wireless mobile communication system comprises a microprocessor using a memory, e.g. a flash memory, ROM, and/or SRAM, for storing a plurality of values according to the first or second embodiment. A transceiving means, provided for communication with the base station of the system including an antenna, comprises an RF module and an antenna. By adopting the method of the present invention, the microprocessor determines transmission power of one of the retransmission packets by executing either Equation 1 or Equation 2 in accordance with the first or second embodiments, respectively.

Accordingly, the retransmission packet transmission power control method according to the present invention reduces the reverse link interference, thereby enabling an increase in packet throughput in a reverse link. Such reduction reverse link interference facilitates link adaptation (e.g., AMC) effectiveness in a forward link.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A method of controlling transmission power of retransmission packets by a mobile terminal in a wireless mobile communication system supporting hybrid automatic retransmission request (HARQ) transmission, the method comprising steps of:
   receiving gain information associated with the sequence of the retransmission packets from a base station, wherein the gain information includes a plurality of adjustment gain values corresponding to each one of data transmission rates and the sequence of the retransmission packets;
   determining transmission power of one of the retransmission packets using one of the plurality of adjustment gain values and one of a plurality of nominal gain values which are already known to the mobile terminal and a pilot-channel transmission power; and
   transmitting the retransmission packet with the determined transmission power.

2. The method of claim 1, wherein the plurality of adjustment gain values are included in an extended channel assignment message (ECAM).

3. The method of claim 1, further comprising the step of receiving a plurality of adjustment gain values which are changed after completion of call establishment with the base station.

4. The method of claim 3, wherein the changed adjustment gain values are included in a universal hand-off direction message (UHDM) or a power control message (PCNM).

5. The method of claim 1, wherein, for each data transmission rate, the adjustment gain values sequentially decrease according to the sequence of retransmission packets.

6. The method of claim 1, wherein the nominal gain values vary according to the data transmission rates.

7. The method of claim 1, wherein the nominal gain values vary according to the data transmission rates and the sequence of the retransmission packets.

8. The method of claim 7, wherein, for each data transmission rate, the nominal gain values decrease with the sequence of the retransmission packets.

9. The method of claim 1, wherein the plurality of nominal gain values comprise a first set of nominal gain values varying according to the data transmission rates and a second set of nominal gain values varying according to the data transmission rates and the sequence of the retransmission packets.

10. The method of claim 9, further comprising a step of receiving a nominal gain value indicator indicating whether to use the first set of nominal gain values or the second set of nominal gain values.

11. The method of claim 10, wherein the nominal gain value indicator is included in an extended channel assignment message (ECAM).

12. The method of claim 9, wherein, for each data transmission rate, the second set of nominal gain values decrease with the sequence of the retransmission packets.

13. A method of controlling transmission power of retransmission packets by a mobile terminal in a wireless mobile communication system supporting hybrid automatic retransmission request (HARQ) transmission, the method comprising steps of:
receiving gain information associated with the sequence of the retransmission packets, wherein the gain information includes a plurality of adjustment power reduction values corresponding to each data transmission rate and the sequence of the retransmission packets;
determining transmission power of one of the retransmission packets using one of the plurality of adjustment power reduction values and one of a plurality of nominal power reduction values which are already known to the mobile terminal; and
transmitting the retransmission packet with the determined transmission power.

14. The method of claim 13, wherein the plurality of adjustment power reduction values are included in an extended channel assignment message (ECAM).

15. The method of claim 13, further comprising a step of receiving a plurality of adjustment power reduction values which are changed after completion of call establishment with the base station.

16. The method of claim 15, wherein the changed adjustment power reduction values are included in a universal hand-off direction message (UHDM) or a power control message (PCNM).

17. The method of claim 13, wherein the plurality of nominal power reduction values vary according to the data transmission rates and the sequence of the retransmission packets.

18. The method of claim 17, further comprising a step of receiving an indicator indicating whether the nominal power reduction values is to be used in determining the transmission power of the retransmission packet.

19. The method of claim 18, wherein the indicator is included in an extended channel assignment message (ECAM).

20. A method of controlling transmission power of retransmission packets in a wireless mobile communication system supporting hybrid automatic retransmission request (HARQ) transmission, the method comprising steps of:
transmitting gain information associated with the sequence of the retransmission packets to at least one mobile terminal, wherein the gain information includes a plurality of adjustment gain values corresponding to each one of data transmission rates and the sequence of the retransmission packets;
determining the transmission power of the retransmission packet by the at least one mobile terminal using one of the plurality of adjustment gain values and one of a plurality of nominal gain values which are already known to the mobile terminal and a pilot-channel transmission power; and
receiving a retransmission packet transmitted at a transmission power from the at least one mobile terminal.

21. The method of claim 20, further comprising a step of transmitting a plurality of adjustment gain values which are changed after completion of call establishment with the at least one mobile terminal.

22. The method of claim 20, wherein, for each data transmission rate, the plurality of adjustment gain values decrease with the sequence of the retransmission packets.

23. The method of claim 20, wherein the plurality of nominal gain values vary according to the data transmission rates.

24. The method of claim 20, wherein the plurality of nominal gain values vary according to the data transmission rates and the sequence of the retransmission packets.

25. The method of claim 24, wherein, for each data transmission rate, the plurality of nominal gain values decrease with the sequence of the retransmission packets.

26. The method of claim 20, wherein the plurality of nominal gain values comprise a first set of nominal gain values varying according to the data transmission rates and a second set of nominal gain values varying according to the data transmission rates and the sequence of the retransmission packets.

27. The method of claim 26, further comprising a step of transmitting a nominal gain value indicator indicating which set of nominal gain values is to be used as the plurality of the nominal gains.

28. The method of claim 26, wherein, for each data transmission rate, the second set of nominal gain values decrease with the sequence of the retransmission packets.

29. The method of claim 20, wherein the gain information includes a plurality of adjustment power reduction values corresponding to each data transmission rate and the sequence of the retransmission packets.

30. The method of claim 29, wherein the transmission power of the retransmission packet is determined using one of the plurality of adjustment power reduction values and one of a plurality of nominal power reduction values which are already known to the mobile terminal.

31. The method of claim 30, further comprising a step of transmitting a plurality of adjustment power reduction values which are changed after completion of call establishment with the base station.

32. The method of claim 30, wherein the plurality of nominal power reduction values vary according to the data transmission rates and the sequence of the retransmission packets.

33. The method of claim 32, further comprising a step of transmitting an indicator indicating whether the nominal power reduction values is to be used in determining the transmission power of the retransmission packet.

34. A mobile terminal used in a mobile telecommunications system supporting hybrid automatic retransmission request (HARQ) transmission, the mobile terminal comprising:
means for receiving, from a base station, a plurality of adjustment power reduction values corresponding to each data transmission rate and the sequence of the retransmission packets and for transmitting packets to the base station;
means for storing a plurality of nominal gain values; and
means for determining transmission power of one of the retransmission packets using one of the plurality of adjustment gain values and one of a plurality of nominal gain values and a pilot-channel transmission power.

35. The mobile terminal of claim 34, wherein, for each data transmission rate, the adjustment gain values sequentially decrease according to the sequence of retransmission packets.

36. The mobile terminal of claim 34, wherein the nominal gain values vary according to the data transmission rates.

37. The mobile terminal of claim 34, wherein the nominal gain values vary according to the data transmission rates and the sequence of the retransmission packets.

38. The mobile terminal of claim 34, wherein, for each data transmission rate, the nominal gain values decrease with the sequence of the retransmission packets.

39. The mobile terminal of claim 34, wherein the plurality of nominal gain values comprise a first set of nominal gain values varying according to the data transmission rates and a second set of nominal gain values varying according to the data transmission rates and the sequence of the retransmission packets.

40. The mobile terminal of claim 39, wherein, for each data transmission rate, the second set of nominal gain values decrease with the sequence of the retransmission packets.

41. A mobile terminal used in a mobile telecommunications system supporting hybrid automatic retransmission request (HARQ) transmission, the mobile terminal comprising:
means for receiving, from a base station, a plurality of adjustment power reduction values corresponding to each one of data transmission rates and the sequence of retransmission packets and for transmitting packets to the base station;
means for storing a plurality of nominal power reduction values; and
means for determining transmission power of one of the retransmission packets using one of the plurality of adjustment power reduction values and one of the plurality of nominal power reduction values.

42. The mobile terminal of claim 41, wherein the plurality of nominal power reduction value vary according to the data transmission rates and the sequence of the retransmission packets.

* * * * *